(12) United States Patent
Kanematsu

(10) Patent No.: US 9,678,742 B2
(45) Date of Patent: Jun. 13, 2017

(54) INFORMATION PROCESSING APPARATUS

(71) Applicant: CANON KABUSHIKI KAISHA, Tokyo (JP)

(72) Inventor: Shinichi Kanematsu, Inagi (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/297,247

(22) Filed: Jun. 5, 2014

(65) Prior Publication Data

US 2014/0373000 A1 Dec. 18, 2014

(30) Foreign Application Priority Data

Jun. 14, 2013 (JP) ................. 2013-125721

(51) Int. Cl.
*G06F 9/44* (2006.01)
*G06F 9/445* (2006.01)

(52) U.S. Cl.
CPC ............. *G06F 8/665* (2013.01); *G06F 8/65* (2013.01)

(58) Field of Classification Search
CPC ........................................ G06F 8/65
USPC ........................................ 717/170
See application file for complete search history.

(56) References Cited

U.S. PATENT DOCUMENTS

| 7,383,541 B1* | 6/2008 | Banks et al. .................. 717/131 |
| 2006/0119884 A1* | 6/2006 | Choi ...................... G06K 15/00 358/1.15 |
| 2007/0169092 A1* | 7/2007 | Lee .......................... G06F 8/65 717/168 |
| 2012/0317562 A1* | 12/2012 | Wang et al. .................. 717/170 |
| 2013/0227543 A1* | 8/2013 | Chen .............................. 717/173 |
| 2014/0123124 A1* | 5/2014 | Gray et al. .................... 717/170 |

FOREIGN PATENT DOCUMENTS

| JP | 2001216167 A | 8/2001 |
| JP | 2001337817 A | 12/2001 |
| JP | 2004287993 A | 10/2004 |
| JP | 2011015382 A | 1/2011 |
| JP | 2001044106 A | 3/2011 |
| JP | 2011081434 A | 4/2011 |
| JP | 2011198056 A | 10/2011 |
| JP | 2012-73862 A | 4/2012 |

OTHER PUBLICATIONS

Jay Freeman; "Cydia downgrade/upgrade"; Cydia website (cydia.saurik.com) as captured by the Wayback Machine Internet Archive (archive.org); Apr. 29, 2013.*
Mark Miyashita; "How to use TinyUmbrella to Update, Downgrade, and Restore your iPhone"; BinaryAge website (hints.binaryage.com); Feb. 27, 2012.*
Adam Pash; "How to Downgrade Your iPhone 3G[S] from iOS 4 to iOS 3.1.3"; Lifehacker website (lifehacker.com); Jun. 24, 2010.*
"Netgear Router Firmware Update"; ee.co.uk website; Mar. 20, 2012.*
Julian Wood; "How to downgrade HP Virtual Connect Flex10 Firmware"; WoodITwork.com website; Jun. 29, 2011.*

* cited by examiner

*Primary Examiner* — Qing Chen
*Assistant Examiner* — Clint Thatcher
(74) *Attorney, Agent, or Firm* — Canon U.S.A., Inc. IP Division

(57) ABSTRACT

An information processing apparatus stores update firmware for updating the firmware of an option unit. When the option unit is connected to the information processing apparatus, the information processing apparatus updates the firmware of the option unit by using the stored update firmware.

9 Claims, 9 Drawing Sheets

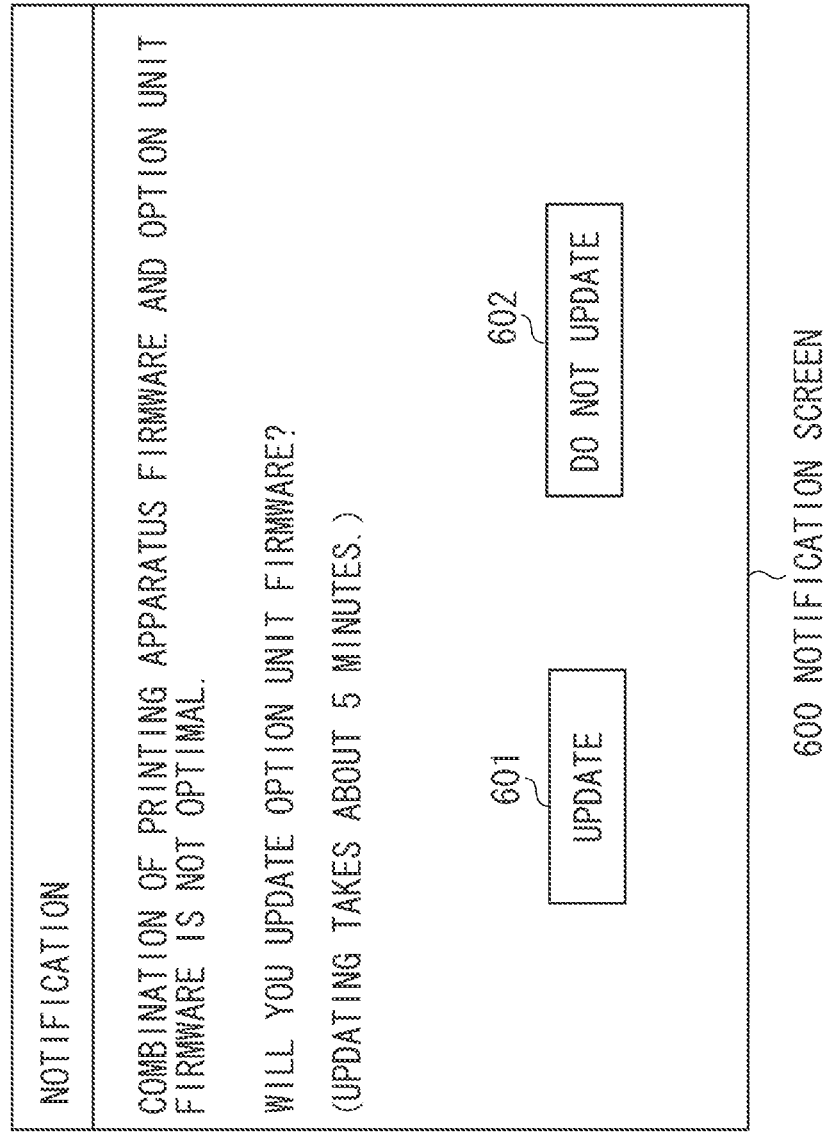

FIG. 7A
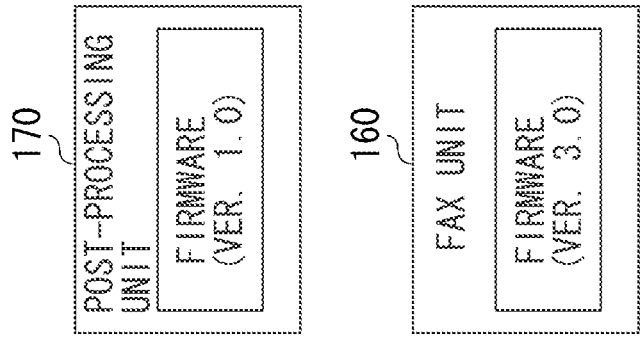
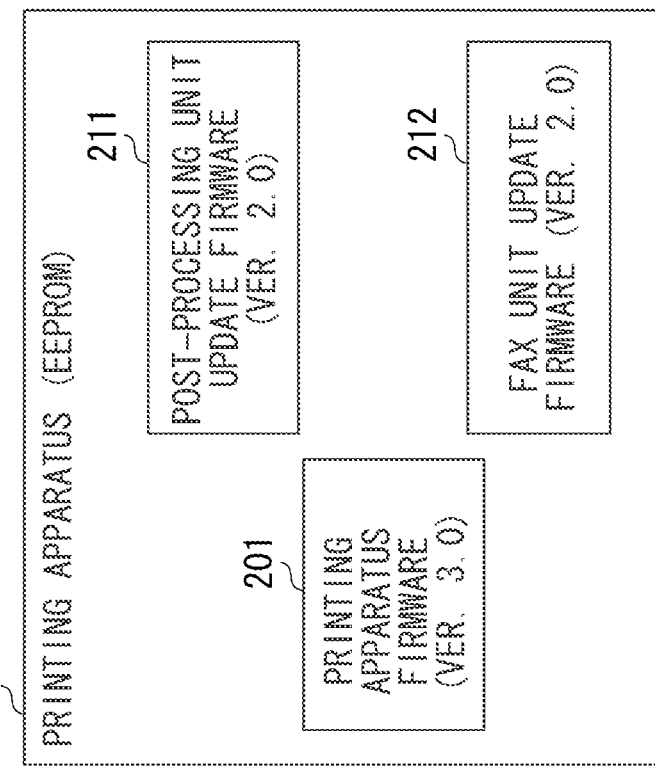

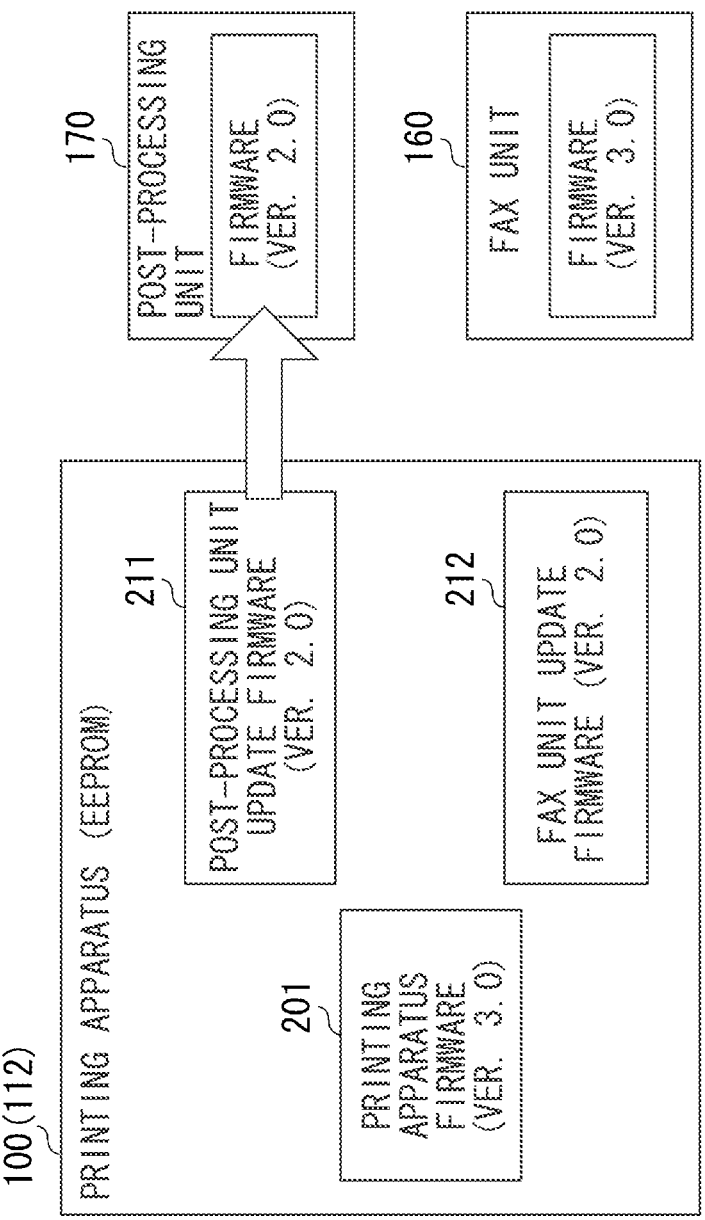

INFORMATION PROCESSING APPARATUS

BACKGROUND OF THE INVENTION

Field of the Invention

The present invention relates to an information processing apparatus to which an option unit can be connected.

Description of the Related Art

Connecting an option unit to a printing apparatus allows a user to use various functions. For example, when a post-processing unit for performing post-processing, such as stapling, is connected to the printing apparatus, the user can perform various types of post-processing on sheets on which printing has been performed.

Such an option unit includes a central processing unit (CPU), and a memory for storing the firmware of the option unit to be executed by the CPU. A technique discussed in Japanese Patent Application Laid-Open No. 2012-73862 is known as a technique for updating the firmware of the option unit and the firmware of the printing apparatus. Japanese Patent Application Laid-Open No. 2012-73862 discusses a technique in which the printing apparatus acquires from a server the firmware for updating the option unit and firmware for updating the printing apparatus, and updates the firmware of the option unit and the firmware of the printing apparatus by using the firmware for updating the option unit and the firmware for updating the printing apparatus, respectively.

The firmware of the printing apparatus and the firmware of the option unit can be updated by using the technique discussed in Japanese Patent Application Laid-Open No. 2012-73862. However, in the case of the technique discussed in the Japanese Patent Application Laid-Open No. 2012-73862. to update firmware, it is necessary that the printing apparatus is connected to a network and can communicate with the server. In other words, in an environment where the printing apparatus cannot be connected to the network or can be connected only to a limited network, such as an in-house infrastructure, the printing apparatus cannot communicate with the server and therefore firmware update cannot be performed.

SUMMARY OF THE INVENTION

According to an aspect of the present invention, a mechanism for updating the firmware of an option unit connected to an information processing apparatus may be used, for example, even in an environment where the information processing apparatus cannot be connected with a network.

According to another aspect of the present invention, an information processing apparatus to which an option unit is connectable includes a storage unit configured to store update firmware for updating firmware of the option unit, an update unit configured to update the firmware of the option unit by using the update firmware stored in the storage unit, a setting unit configured to set any one of a first update method in which the update unit updates the firmware of the option unit in both cases where a version of the firmware of the option unit is to be upgraded and where the version of the firmware of the option unit is to be downgraded, and a second update method in which the update unit updates the firmware of the option unit in a case where the version of the firmware of the option unit is to be upgraded and does not update the firmware of the option unit in a case where the version of the firmware of the option unit is to be downgraded. Further, the update unit operates according to the update method set by the setting unit.

Further features of the present invention will become apparent from the following description of exemplary embodiments with reference to the attached drawings.

BRIEF DESCRIPTION OF THE DRAWINGS

FIG. 6 is a diagram illustrating a notification screen for prompting a user to update firmware of an option unit.

FIGS. 7A and 7B are diagrams each illustrating updating firmware of an option unit.

DESCRIPTION OF THE EMBODIMENTS

Various exemplary embodiments, features, and aspects of the invention will be described in detail below with reference to the drawings. The following exemplary embodiments are not intended to limit the present invention according to the appended claims. Not all of the combinations of the features described in the exemplary embodiments are indispensable to the solutions for the present invention.

Figure 1A:
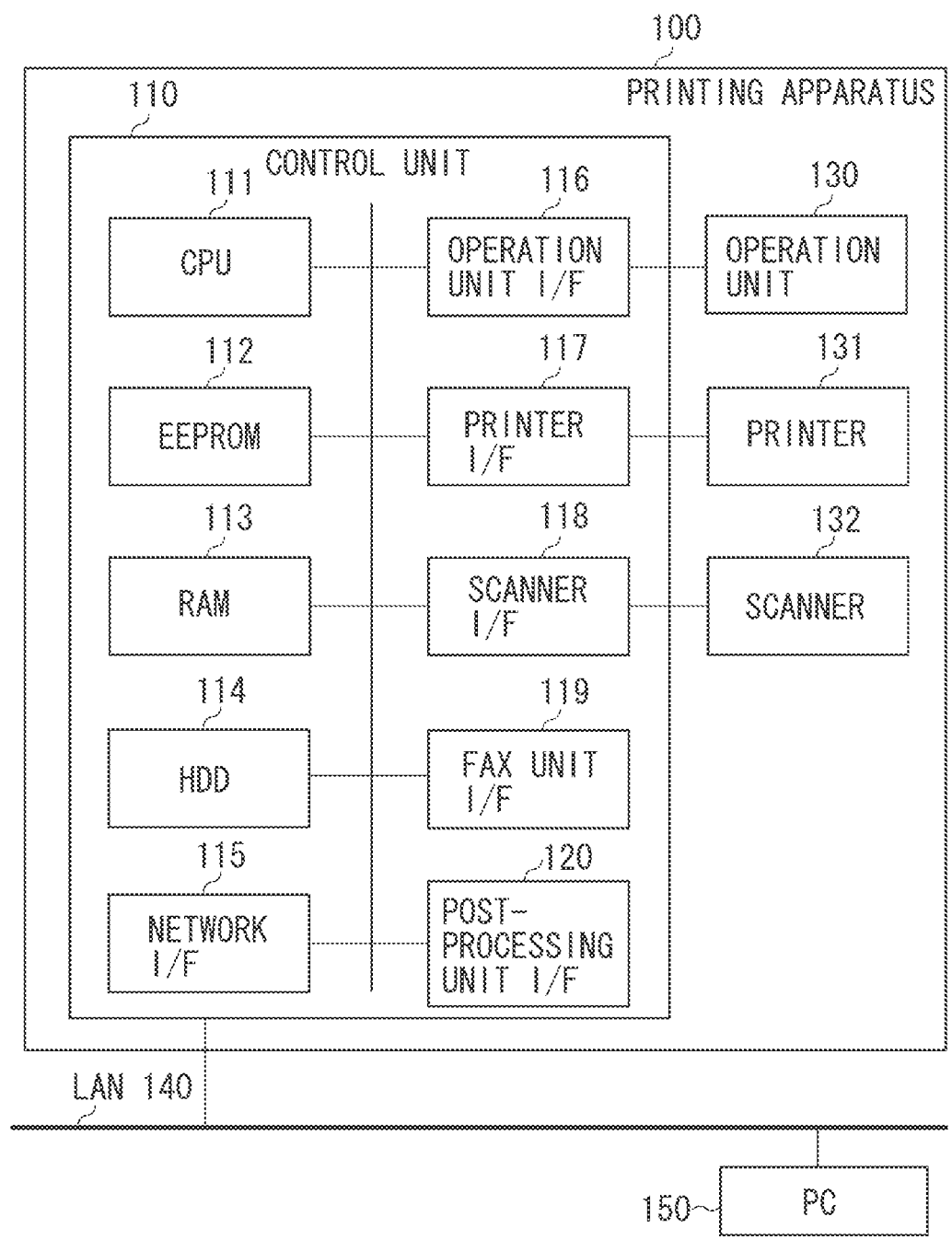
FIGS. 1A and 1B are diagrams each illustrating a hardware configuration of a printing apparatus.

FIG. 1A is a diagram illustrating a configuration of a printing apparatus 100. The printing apparatus 100 is an example of an information processing apparatus to which an option unit can be connected.

A control unit 110 includes a CPU 111, and controls the entire operation of the printing apparatus 100. The CPU 111 reads firmware stored in an EEPROM 112 to perform various types of control such as print control. A random access memory (RAM) 113 is used as a temporary storage area such as a main memory and a work area for the CPU 111. A hard disk drive (HDD) 114 stores data, various types of programs, and various types of information tables. A network interface (I/F) 115 is connected to a local area network (LAN) 140. The printing apparatus 100 can communicate with an external apparatus, such as a personal computer (PC) 150, via the network I/F 115.

A operation unit I/F 116 connects an operation unit 130 and the control unit 110. The operation unit 130 includes a liquid crystal display unit having a touch panel function, a keyboard, and various types of function keys. The user can view a screen displayed on the operation unit 130, and input various kinds of instructions to the printing apparatus 100 by using the touch panel.

A printer I/F 117 connects a printer 131 and the control unit 110. The printer 131 performs print processing on a sheet fed from a sheet feeding cassette (not illustrated), based on print data input via the printer I/F 117.

A scanner I/F 118 connects a scanner 132 and the control unit 110. The scanner 132 reads a document placed thereon, and generates image data. The image data generated by the scanner 132 is printed by the printer 131, stored in the HDD 114, or transmitted to an external apparatus via the network I/F 115.

In the present exemplary embodiment, various option units can be connected to the printing apparatus 100. A facsimile (hereinafter referred to as FAX) unit I/F 119 and a post-processing unit I/F 120 are interfaces each for connecting a corresponding option unit.

Figure 1B:
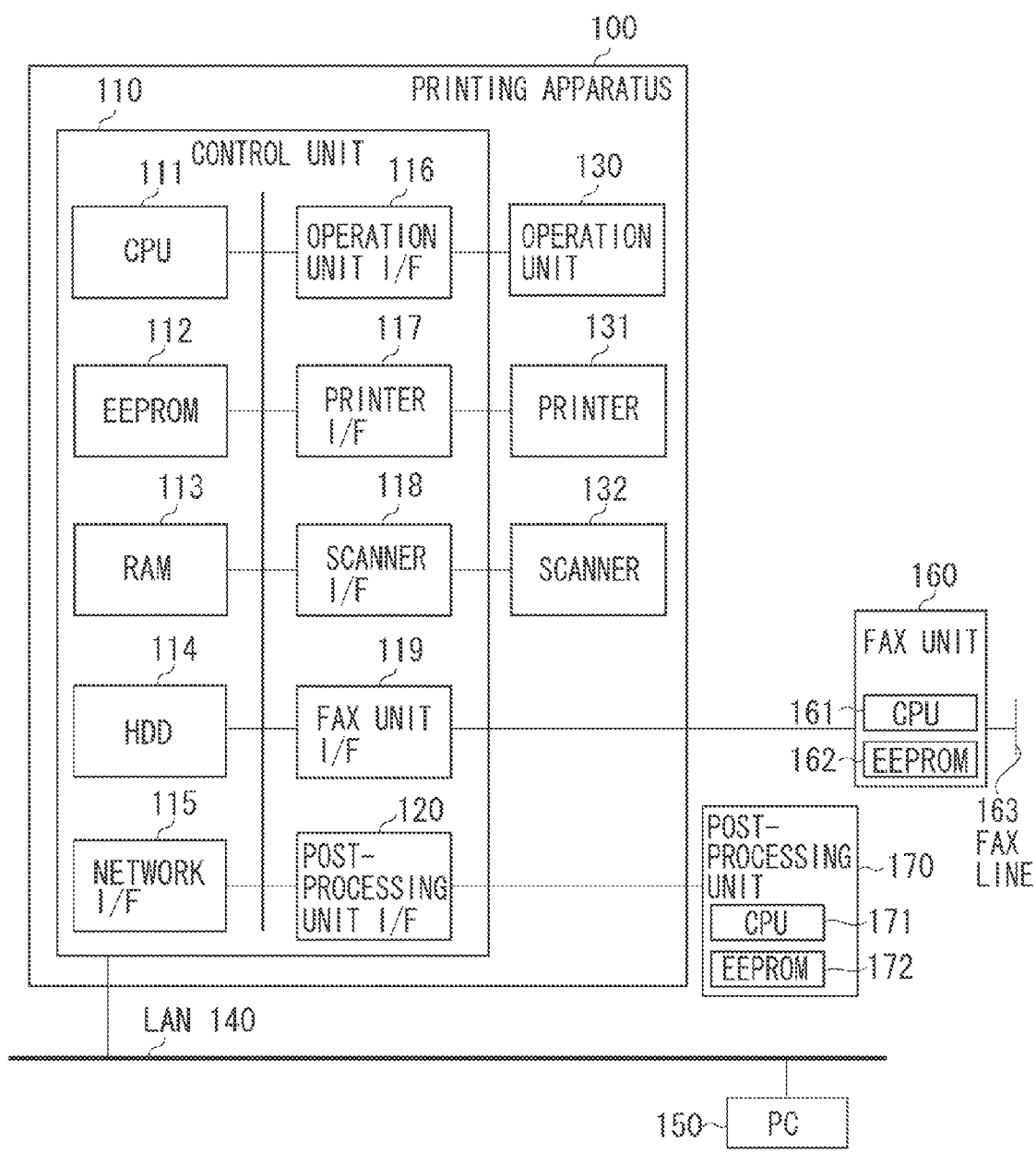

FIG. 1B is a diagram illustrating a configuration of the printing apparatus 100 when option units are connected thereto. A FAX unit 160 is connected to the FAX unit I/F 119, and performs FAX communication via a FAX line 163. The FAX unit 160 includes a CPU 161 and an EEPROM 162. When the CPU 161 reads and executes firmware stored in the EEPROM 162, the FAX unit 160 performs FAX communication.

A post-processing unit 170 is connected to the post-processing unit I/F 120. The post-processing unit 170 performs post-processing (e.g., stapling processing, punching processing, and saddle stitch bookbinding processing) on sheets on which printing has been performed by the printer 131. The post-processing unit 170 includes a CPU 171 and an EEPROM 172. When the CPU 171 reads and executes firmware stored in the EEPROM 172, the post-processing unit 170 performs post-processing.

Although, in the present exemplary embodiment, the FAX unit 160 and the post-processing unit 170 are described as option units for the printing apparatus 100, types of option units are not limited thereto.

Although, in the printing apparatus 100, the CPU 111 executes each processing illustrated in flowcharts (described below) by using a single memory (RAM 113), the configuration is not limited thereto. For example, the printing apparatus 100 may execute each processing in flowcharts illustrated in FIGS. 4 and 5 (described below) by operating a plurality of CPUs and a plurality of memories in cooperation with one another.

Figure 2:
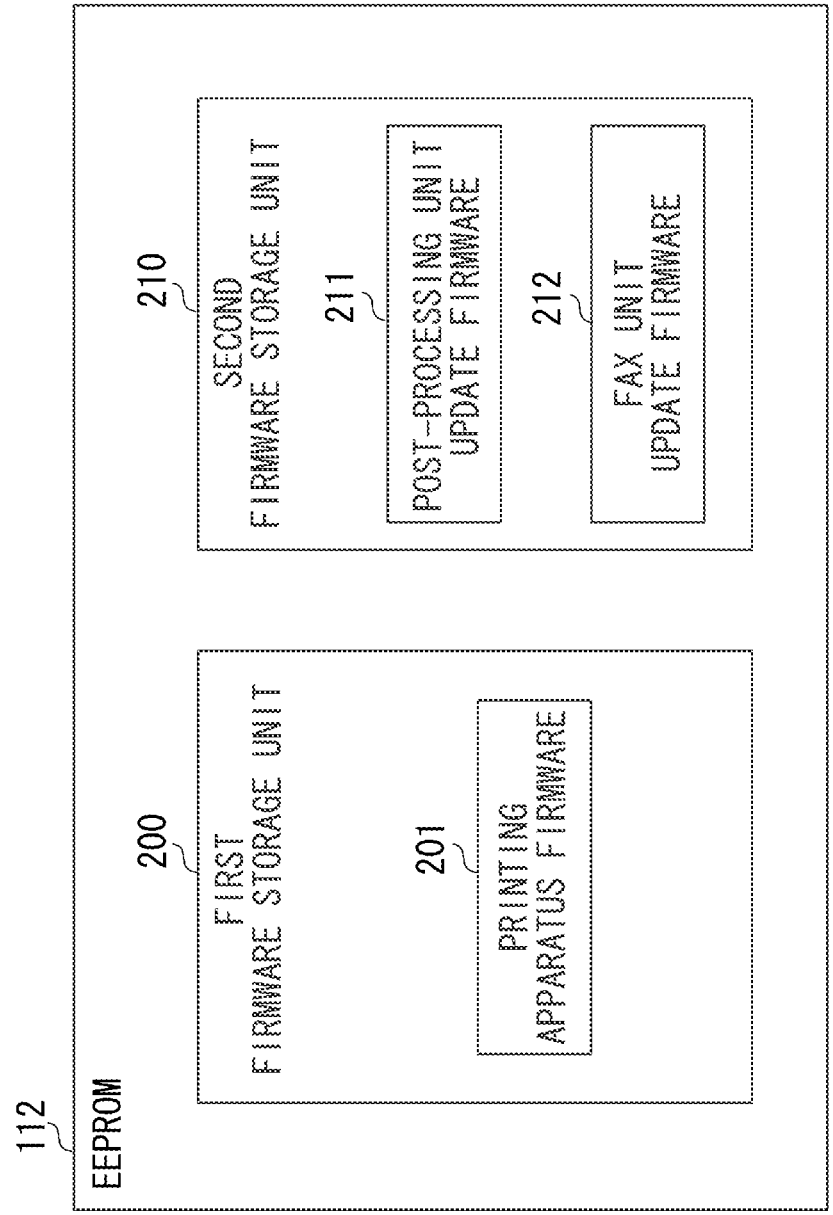
FIG. 2 is a diagram illustrating a configuration of an electrically erasable programmable read only memory (EEPROM).

In the present exemplary embodiment, the printing apparatus 100 stores in the EEPROM 112 not only the printing apparatus firmware for the printing apparatus 100 itself but also the update firmware for updating the firmware of an option unit. FIG. 2 is a diagram illustrating a configuration of the EEPROM 112.

The EEPROM 112 includes a first firmware storage unit 200 and a second firmware storage unit 210. The first firmware storage unit 200 stores printing apparatus firmware 201 for the printing apparatus 100 itself. The CPU 111 reads and executes the printing apparatus firmware 201 to control the entire operation of the printing apparatus 100.

The second firmware storage unit 210 stores post-processing unit update firmware 211 and FAX unit update firmware 212 as update firmware for updating the firmware of option units. The printing apparatus 100 can update the firmware of the option units by using the above-described update firmware.

In the present exemplary embodiment, the printing apparatus firmware 201, the post-processing unit update firmware 211, and the FAX unit update firmware 212 are prestored in the EEPROM 112 of the printing apparatus 100 at the time of product shipment. The printing apparatus firmware 201 and the firmware for option units (the post-processing unit update firmware 211 and the FAX unit update firmware 212) are stored in the EEPROM 112 in a combination in which operation is guaranteed by the vendor (manufacturer) of the printing apparatus 100.

Combinations in which operation is guaranteed by the vendor are not limited to the combination stored in the EEPROM 112. As a matter of course, operation is verified and guaranteed in various combinations. In the present exemplary embodiment, the EEPROM 112 stores one combination out of various combinations in which operation is guaranteed by the vendor.

In the present exemplary embodiment, when an option unit is connected to the printing apparatus 100, the printing apparatus 100 compares the version of the firmware of the option unit with the version of the option unit update firmware stored in the EEPROM 112. When the versions do not match each other, the printing apparatus 100 updates the firmware of the option unit by using the option unit update firmware stored in the EEPROM 112. In the present exemplary embodiment, a method for updating the firmware of an option unit can be set, and the printing apparatus 100 operates according to the set update method.

Figure 3:
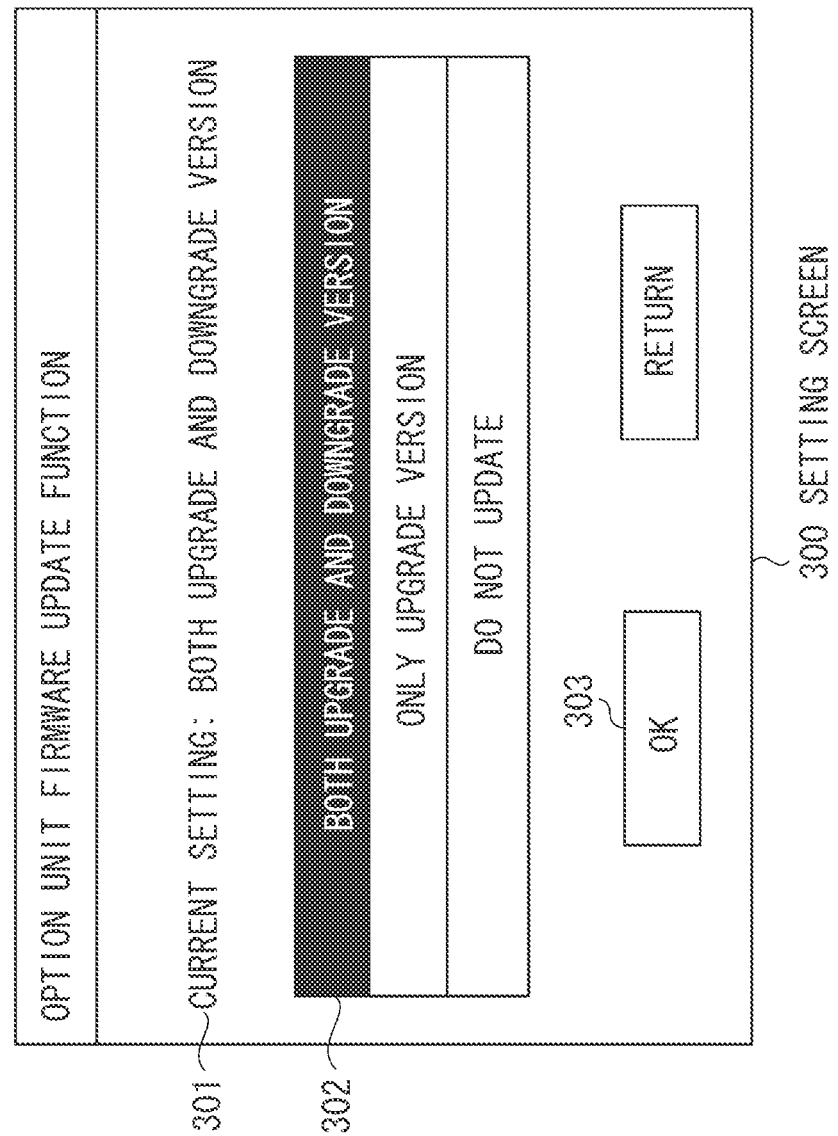
FIG. 3 is a diagram illustrating a setting screen for setting a method for updating an option unit.

A setting screen 300 illustrated in FIG. 3 allows the user to set the method for updating the firmware of an option unit, and is displayed on the operation unit 130. An item 301 indicates the update method that is currently set. An item 302 indicates options for the option unit firmware update method, "BOTH UPGRADE AND DOWNGRADE VERSION", "ONLY UPGRADE VERSION", and "DO NOT UPDATE". The user can specify a desired update method. When the user specifies a desired update method in the item 302 and then presses an OK button 303, the update method specified by the user is stored in a memory such as the HDD 114.

Each update method will be described below. When the firmware of an option unit is updated by using the option unit update firmware stored in the EEPROM 112, there are two possible cases. Specifically, one case is that the firmware version of the option unit is to be upgraded, and another case is that the firmware version of the option unit is to be downgraded. A case where the firmware version of the option unit is to be upgraded is a case where the firmware of the option unit is to be upgraded. A case where the firmware version of the option unit is to be downgraded is a case where the firmware of the option unit is to be downgraded.

When the update method is set to "BOTH UPGRADE AND DOWNGRADE VERSION", the printing apparatus 100 updates the firmware of the option unit in both cases where the firmware version of the option unit is to be upgraded and where the firmware version of the option unit is to be downgraded. Thus, the combination of the firmware of the printing apparatus 100 and the updated firmware of the option unit matches the combination stored in the EEPROM 112 by the printing apparatus 100. If the user desires to give a priority to the combination of the firmware of the printing apparatus 100 and the firmware of the option unit guaranteed by the vendor, it is desirable for the user to set the update method to "BOTH UPGRADE AND DOWNGRADE VERSION".

When the update method is set to "ONLY UPGRADE VERSION", the printing apparatus 100 updates the firmware of the option unit only when the firmware version of the option unit is to be upgraded. On the other hand, when the firmware version of the option unit is to be downgraded, the printing apparatus 100 does not update the firmware of the option unit. A case where the firmware version of the option unit is to be downgraded is, for example, a case where the user purchases the option unit after some period of time has elapsed since the purchase of the printing apparatus 100, and the firmware of the purchased option unit has already been renewed. In this case, if the user does not desire to downgrade the firmware version of the option unit, it is desirable for the user to set the update method to "ONLY UPGRADE VERSION".

When the update method is set to "DO NOT UPDATE", the printing apparatus 100 does not update the firmware of the option unit in either case where the firmware version of the option unit is to be upgraded or to be downgraded. For example, when an option unit having specially customized firmware is used, if the user does not desire to change the firmware of the option unit, it is desirable for the user to set the update method to "DO NOT UPDATE".

As described above, the user can set a desired update method by using the setting screen 300. Although, in the present exemplary embodiment, any user can make a setting in the setting screen 300, only a specific user (for example, a user having administrator's authority) may be allowed to make a setting in the setting screen 300 by introducing a user authentication function to the printing apparatus 100. Further, a setting may be made in the setting screen 300 only in a specific operation mode, such as a service mode in which a service engineer performs maintenance.

Figure 4:
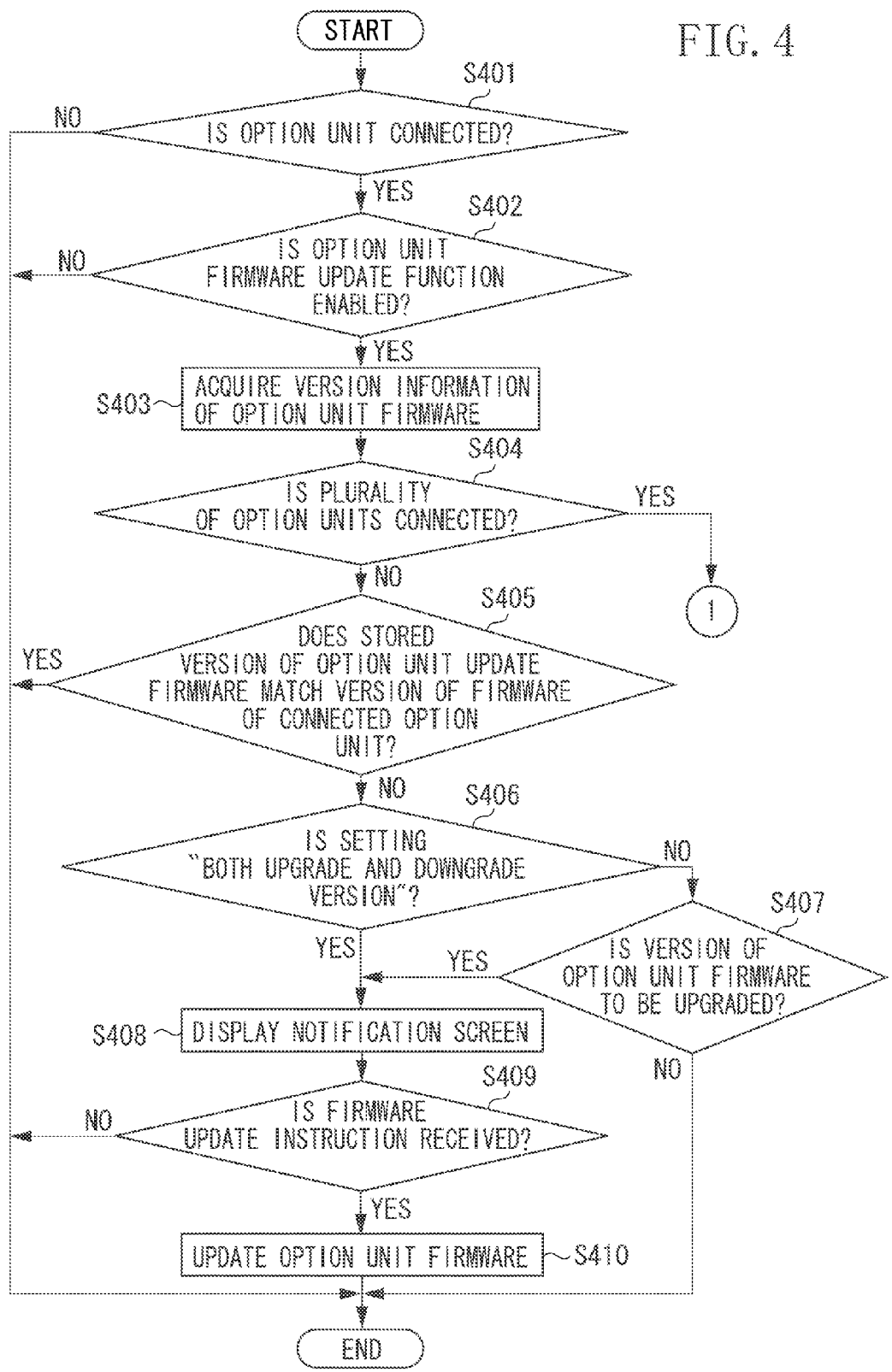
FIG. 4 is a diagram illustrating processing for updating firmware of an option unit.
Figure 5:
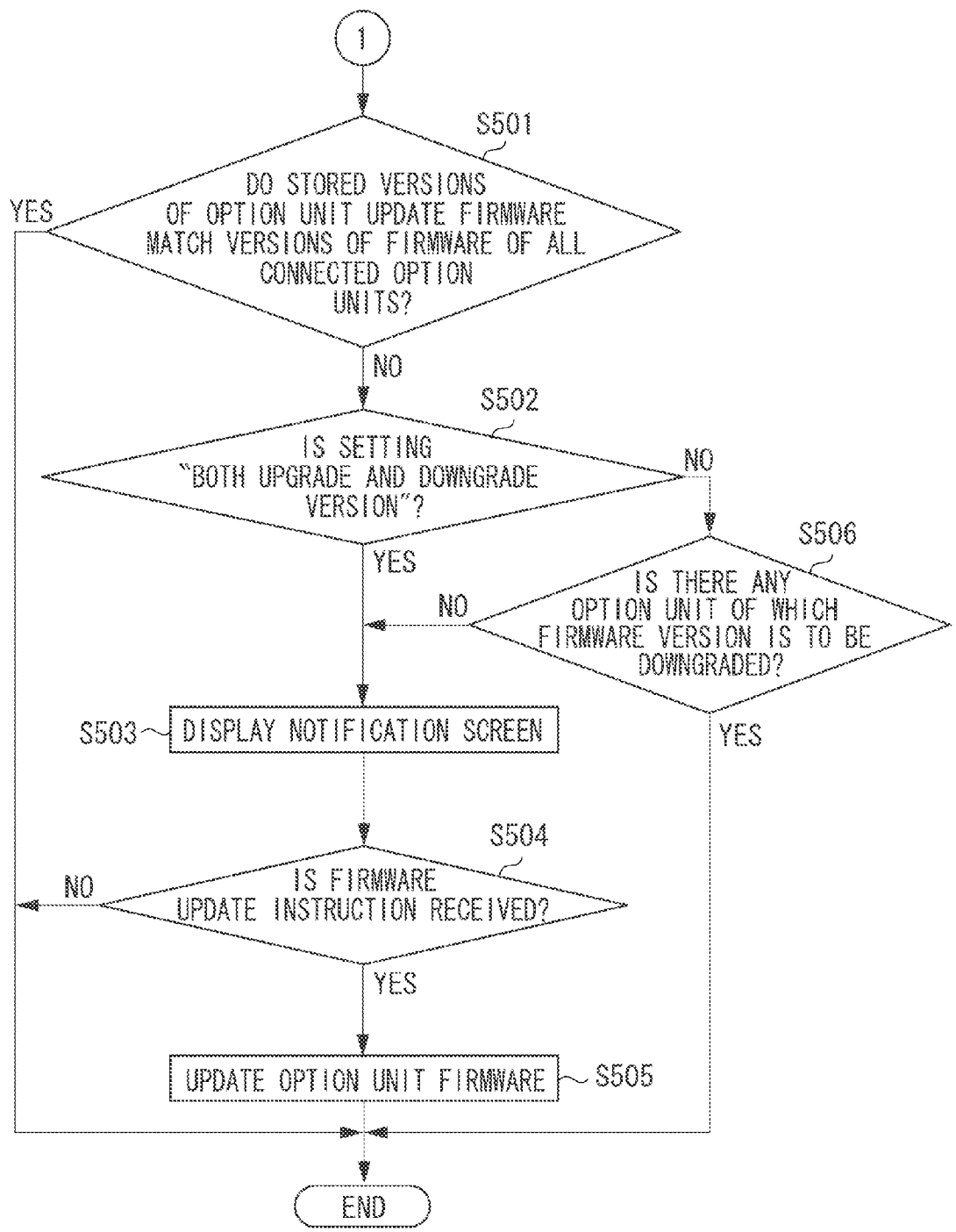
FIG. 5 is a diagram illustrating processing for updating firmware of an option unit.

Next, update processing performed by the printing apparatus 100 to update the firmware of an option unit will be described with reference to the flowcharts illustrated in FIGS. 4 and 5. Each step of the flowcharts illustrated in FIGS. 4 and 5 is implemented when the CPU 111 loads a program stored in a memory such as the EEPROM 112, into the RAM 113 and then executes the program. In the present exemplary embodiment, the user presets the update method in the setting screen 300, and the preset update method is stored in a memory such as the HDD 114.

When the main power of the printing apparatus 100 is turned on, in step S401, the CPU 111 determines whether an option unit is connected. In the case of the printing apparatus 100, the CPU 111 determines whether an option unit is connected to either the FAX unit I/F 119 or the post-processing unit I/F 120. When an option unit is not connected to either the FAX unit I/F 119 or the post-processing unit I/F 120 (NO in step S401), the processing illustrated in the flowchart ends. On the other hand, when an option unit is connected to any of the FAX unit I/F 119 and the post-processing unit I/F 120 (YES in step S401), the processing proceeds to step S402.

Step S402 will be described below. In step S402, by referring to a memory such as the HDD 114, the CPU 111 determines whether the option unit firmware update function is enabled. When the update method is set to "BOTH UPGRADE AND DOWNGRADE VERSION" or "ONLY UPGRADE VERSION", the CPU 111 determines that the option unit firmware update function is enabled (YES in step S402), and the processing proceeds to step S403. On the other hand, when the update method is set to "DO NOT UPDATE", the CPU 111 determines that the option unit firmware update function is not enabled (NO in step S402), and ends the processing in the flowchart without updating the firmware of the option unit.

Step S403 will be described below. In step S403, the CPU 111 acquires version information indicating the firmware version of the option unit from the option unit connected to the printing apparatus 100. The version information is acquired from the option unit via the FAX unit I/F 119 or the post-processing unit I/F 120. When a plurality of option units is connected to the printing apparatus 100, the CPU 111 acquires version information from the plurality of option units.

In step S404, the CPU 111 determines whether a plurality of option units is connected to the printing apparatus 100. When the CPU 111 determines that a plurality of option units is connected to the printing apparatus 100 (YES in step S404), the processing proceeds to step S501 illustrated in FIG. 5. The flowchart illustrated in FIG. 5 will be described below. On the other hand, when the CPU 111 determines that a plurality of option units is not connected to the printing apparatus 100, i.e., only one option unit is connected thereto (NO in step S404), the processing proceeds to step S405.

Step S405 will be described below. In step S405, the CPU 111 determines whether the version of the option unit update firmware stored in the EEPROM 112 matches the version of the firmware of the option unit connected to the printing apparatus 100. In the present exemplary embodiment, to make this determination, the CPU 111 compares the firmware version of the option unit indicated by the version information acquired in step S403 with the version of the option unit update firmware stored in the EEPROM 112. When the version of the option unit update firmware stored in the EEPROM 112 matches the version of the firmware of the option unit connected to the printing apparatus 100 (YES in step S405), the CPU 111 ends the processing in the flowchart without updating the firmware of the option unit. On the other hand, when the version of the option unit update firmware stored in the EEPROM 112 does not match the version of the firmware of the option unit connected to the printing apparatus 100 (NO in step S405), the processing proceeds to step S406.

Step S406 will be described below. In step S406, by referring to a memory such as the HDD 114, the CPU 111 determines whether the option unit firmware update method is set to "BOTH UPGRADE AND DOWNGRADE VERSION". When the option unit firmware update method is set to "BOTH UPGRADE AND DOWNGRADE VERSION" (YES in step S406), the processing proceeds to step S408. On the other hand, when the option unit firmware update method is set to "ONLY UPGRADE VERSION" (NO in step S406), the processing proceeds to step S407.

Step S407 will be described below. In step S407, the CPU 111 determines whether the firmware version of the option unit is to be upgraded as a result of firmware update. To make this determination, the CPU 111 compares the firmware version of the option unit indicated by the version information acquired in step S403 with the version of the option unit update firmware stored in the EEPROM 112. When the version of the update firmware stored in the EEPROM 112 is later than the firmware version of the option unit, the CPU 111 determines that the firmware version of the option unit is to be upgraded (YES in step S407), and the processing proceeds to step S408.

On the other hand, when the firmware version of the option unit is later than the version of the update firmware stored in the EEPROM 112, the CPU 111 determines that the firmware version of the option unit is not to be upgraded, i.e., to be downgraded (NO in step S407), and ends the processing in the flowchart without updating the firmware of the option unit. This is because the option unit firmware update method is set to "ONLY UPGRADE VERSION". When the option unit firmware update method is set to "ONLY UPGRADE VERSION" and the firmware version of the option unit is to be downgraded as a result of firmware update, the printing apparatus 100 does not update the firmware of the option unit.

Step S408 will be described below. In step S408, the operation unit 130 displays the notification screen 600 illustrated in FIG. 6. The notification screen 600 is a screen for prompting the user to update the firmware of the option unit. The notification screen 600 allows the user to know that the firmware of the option unit needs to be updated. The user who has viewed the notification screen 600 instructs whether to update the firmware of the option unit. When the user desires to update the firmware of the option unit, the user presses an "UPDATE" button 601. On the other hand, when the user does not desire to update the firmware of the option unit, the user presses a "DO NOT UPDATE" button 602.

Step S409 will be described below. In step S409, the CPU 111 determines whether an instruction for updating the firmware of the option unit is received. When the user presses the "UPDATE" button 601 in the notification screen 600, the CPU 111 determines that the instruction for updating the firmware of the option unit is received (YES in step S409), and the processing proceeds to step S410. On the other hand, when the user presses the "DO NOT UPDATE" button 602 in the notification screen 600, the CPU 111 determines that the instruction for updating the firmware of the option unit is not received (NO in step S409), and ends the processing in the flowchart without updating the firmware of the option unit.

Step S410 will be described below. In step S410, the CPU 111 updates the firmware of the option unit by using the option unit update firmware stored in the EEPROM 112. For example, when the FAX unit 160 is connected as an option unit, the CPU 111 transmits the FAX unit update firmware 212 to the FAX unit 160 via the FAX unit I/F 119. Then, the FAX unit 160 updates the firmware of the FAX unit 160 based on the received FAX unit update firmware 212.

Next, processing performed when a plurality of option units is connected to the printing apparatus 100 (i.e., in a case of YES in step S404) will be described with reference to the flowchart illustrated in FIG. 5. In step S501, the CPU 111 determines whether the firmware versions of the plurality of connected option units match the corresponding versions of the option unit update firmware stored in the EEPROM 112. When all the firmware versions of the plurality of option units match the corresponding versions of the option unit update firmware stored in the EEPROM 112 (YES in step S501), the CPU 111 ends the processing in the flowchart without updating the firmware of the option units. On the other hand, when the version of at least one option unit does not match the corresponding version of the option unit update firmware stored in the EEPROM 112 (NO in step S501), the processing proceeds to step S502.

Step S502 will be described below. In step S502, by referring to a memory such as the HDD 114, the CPU 111 determines whether the option unit firmware update method is set to "BOTH UPGRADE AND DOWNGRADE VERSION". When the option unit firmware update method is set to "BOTH UPGRADE AND DOWNGRADE VERSION" (YES in step S502), the processing proceeds to step S503. On the other hand, when the option unit firmware update method is set to "ONLY UPGRADE VERSION" (NO in step S502), the processing proceeds to step S506.

Step S506 will be described below. In step S506, the CPU 111 determines whether there is an option unit of which the firmware version is to be downgraded among the plurality of option units connected to the printing apparatus 100. When there is no option unit of which the firmware version is to be downgraded (NO in step S506), the processing proceeds to step S503.

On the other hand, when there is at least one option unit of which the firmware version is to be downgraded among the plurality of option units (YES in step S506), the CPU 111 ends the processing in the flowchart without updating the firmware of the option units. Even when there is an option unit of which the firmware version is to be upgraded, the CPU 111 does not update the firmware of the plurality of option units including the option unit of which the firmware version is to be upgraded. The reason for this will be described below with reference to FIGS. 7A and 7B.

FIG. 7A is a diagram illustrating the firmware included in the printing apparatus 100, and the firmware included in each option unit (the post-processing unit 170 and the FAX unit 160). The option unit firmware update method is set to "ONLY UPGRADE VERSION".

The printing apparatus 100 includes the printing apparatus firmware 201, the post-processing unit update firmware 211, and the FAX unit update firmware 212. It is assumed here that the printing apparatus 100 includes the printing apparatus firmware 201 "version 3.0", the post-processing unit update firmware 211 "version 2.0", and the FAX unit update firmware 212 "version 2.0". It is also assumed that the post-processing unit 170 includes the firmware "version 1.0", and the FAX unit 160 includes the firmware "version 3.0".

In the case illustrated in FIG. 7A, since the firmware version of the FAX unit 160 is to be downgraded, the CPU 111 does not update the firmware of the FAX unit 160. On the other hand, although the firmware version of the post-processing unit 170 is to be upgraded, in the present exemplary embodiment, the CPU 111 does not update the firmware of the post-processing unit 170, either.

If the firmware of the post-processing unit 170 is updated, the state illustrated in FIG. 7A becomes the state illustrated in FIG. 7B. The case illustrated in FIG. 7B differs from the case illustrated in FIG. 7A in that the firmware version of the post-processing unit 170 has been upgraded. In the present exemplary embodiment, it is desirable that the combination of the firmware of the printing apparatus 100 and the firmware of the option unit is the combination guaranteed by the vendor. Specifically, in the cases illustrated in FIGS. 7A and 7B, the combination guaranteed by the vendor is the combination of the firmware "version 3.0" of the printing apparatus 100, the firmware "version 2.0" of the post-processing unit 170, and the firmware "version 2.0" of the FAX unit 160. As illustrated in FIG. 7B, even when the firmware of the post-processing unit 170 is updated, the combination of the firmware after the update will not match the combination guaranteed by the vendor.

In the present exemplary embodiment, therefore, when there is at least one option unit of which the firmware version is to be downgraded among the plurality of option units (YES in step S506), the CPU 111 does not update the firmware of the plurality of option units. Specifically, in the cases illustrated in FIGS. 7A and 7B, the CPU 111 ends the processing in the flowchart illustrated in FIG. 5 without updating the firmware of the post-processing unit 170 of which the firmware version is to be upgraded. This prevents firmware update from being performed when the combination of firmware versions after firmware update does not match the combination guaranteed by the vendor.

As a modification example of the present exemplary embodiment, in the cases illustrated with FIGS. 7A and 7B, it is also possible to update the firmware of the post-processing unit 170 of which the firmware version is to be upgraded.

The flowchart illustrated in FIG. 5 will be described below again. In step S503, the operation unit 130 displays the notification screen 600 illustrated in FIG. 6. The processing in step S503 is similar to the processing in step S408 and the description thereof will be omitted here.

In step S504, the CPU 111 determines whether an instruction for updating the firmware of the option unit(s) is received. The processing in step S504 is similar to the processing in step S409 and the description thereof will be omitted here.

Step S505 will be described below. In step S505, the CPU 111 updates the firmware of the option unit(s) by using the option unit update firmware stored in the EEPROM 112. The processing in step S505 is similar to the processing in step S410 and the description thereof will be omitted here.

As described above, according to the present exemplary embodiment, the user can set the option unit firmware update method to any one of "BOTH UPGRADE AND DOWNGRADE VERSION", "ONLY UPGRADE VERSION", and "DO NOT UPDATE". This allows update of the firmware of an option unit to be flexibly managed according to the use and environment of the user.

By setting "ONLY UPGRADE VERSION", the user can update the firmware of an option unit by using the update firmware stored in the EEPROM 112 while preventing update of an option unit of which the firmware version is to be downgraded.

In the first exemplary embodiment, the CPU 111 displays the notification screen 600 illustrated in FIG. 6 in step S408 illustrated in FIG. 4 and step S503 illustrated in FIG. 5. On the other hand, in a second exemplary embodiment, the CPU 111 updates the firmware of an option unit without displaying the notification screen 600. Specifically, in step S410, the CPU 111 updates the firmware of an option unit without performing the processing in steps S408 and S409 illustrated in FIG. 4. Further, in step S505, the CPU 111 updates the firmware of an option unit without performing the processing in steps S503 and S504 illustrated in FIG. 5.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-125721 filed Jun. 14, 2013, which is hereby incorporated by reference herein in its entirety.

What is claimed is:

1. A printing apparatus configured to execute print processing on a sheet, the printing apparatus comprising:

a connection interface configured to connect a post-processing unit which executes post-processing on a sheet on which the print processing has been executed, wherein the post-processing unit holds firmware;

a memory configured to store control firmware for controlling operation of the printing apparatus and update firmware for updating the firmware held by the post-processing unit, wherein the memory stores the update firmware before the post-processing unit is connected to the connection interface;

a presetting unit configured to preset, according to a user's instruction before the printing apparatus obtains version information regarding the firmware from the post-processing unit, wherein the presetting unit is configured to preset a presetting, as a preset update method, to select either one of selectable options including a first presetting regarding an update method in which update of the firmware held by the post-processing unit with the update firmware is not permitted, wherein the first presetting is preset before the printing apparatus obtains, from the post-processing unit, the version information of the firmware held in the post-processing unit, a second presetting regarding an update method in which, in a case where a version of the firmware held by the post-processing unit is only upgraded, the update of the firmware held by the post-processing unit with the update firmware is permitted, wherein the second presetting is preset before the printing apparatus obtains, from the post-processing unit, the version information of the firmware held in the post-processing unit, and a third presetting regarding an update method in which, in both cases where the version of the firmware held by the post-processing unit is upgraded and the version of the firmware held by the post-processing unit is downgraded, the update of the firmware held by the post-processing unit with the update firmware is permitted, wherein the third presetting is preset before the printing apparatus obtains, from the post-processing unit, the version information of the firmware held in the post-processing unit;

an obtaining unit configured to obtain, from the post-processing unit, the version information of the firmware held in the post-processing unit after the presetting unit presets the preset update method;

a first determining unit configured to determine whether the post-processing unit has been connected to the connection interface, when the printing apparatus is started;

a second determining unit configured to determine whether the firmware held by the post-processing unit is to be updated, based on a result of presetting by the presetting unit and the version information of the firmware obtained by the obtaining unit, in a case where the first determining unit determines that the post-processing unit has been connected to the connection interface; and an updating unit configured to update the firmware held by the post-processing unit with the update firmware stored in the memory in a case where the second determining unit determines that the firmware held by the post-processing unit is to be updated, wherein the update is performed, without user's input regarding selecting a version of the firmware for the post-processing unit after the version information of the firmware held in the post-processing unit is obtained;

wherein, in a case where the third presetting is preset by the presetting unit and a version of the update firmware is different from the version of the firmware held by the post-processing unit, the second determining unit determines that the firmware held by the post-processing unit is to be updated, in a case where the second presetting is preset by the presetting unit and the version of the update firmware is later than the version of the firmware held by the post-processing unit, the second determining unit determines that the firmware held by the post-processing unit is to be updated, in a case where the second presetting is preset by the presetting unit and the version of the update firmware is older than the version of the firmware held by the post-processing unit, the second determining unit determines that the firmware held by the post-processing unit is not to be updated, and in a case where the first presetting is preset by the presetting unit, the second determining unit determines that the firmware held by the post-processing unit is not to be updated, and wherein the presetting unit, the first determining unit, the second determining unit, and the updating unit are implemented at least in part by at least one processor.

2. The printing apparatus according to claim 1, further comprising a display unit configured to display, in a case where the second determining unit determines that the firmware held by the post-processing unit is to be updated, a notification screen for prompting a user to update the firmware held by the post-processing unit, wherein, in a case where the user issues an instruction to update the firmware held by the post-processing unit via the notification screen, the updating unit updates the firmware held by the post-processing unit by with the update firmware, and wherein, in a case where the user issues an instruction not to update the firmware held by the post-processing unit via the notification screen, the updating unit does not update the firmware held by the post-processing unit.

3. The printing apparatus according to claim 1, wherein, in a case where the second determining unit determines that the firmware held by the post-processing unit is not to be updated, the updating unit does not update the firmware held by the post-processing unit.

4. The printing apparatus according to claim 1, wherein, in a case where the version of the update firmware matches the version of the firmware held by the post-processing unit, the updating unit does not update the firmware held by the post-processing unit.

5. A method of controlling a printing apparatus, the printing apparatus configured to execute print processing on a sheet, the printing apparatus having a connection interface configured to connect a post-processing unit which executes post-processing on a sheet on which the print processing has been executed, the post-processing unit holding firmware, the method performed using a processor and a memory, the memory configured to store control firmware for controlling operation of the printing apparatus and update firmware for updating the firmware held by the post-processing unit, wherein the memory stores the update firmware before the post-processing unit is connected to the connection interface, the method comprising:

presetting, according to a user's instruction before the printing apparatus obtains version information regarding the firmware from the post-processing unit, wherein the presetting is configured to preset a presetting, as a preset update method, to select either one of selectable options including a first presetting regarding an update method in which update of the firmware held by the post-processing unit with the update firmware is not permitted, wherein the first presetting is preset before the printing apparatus obtains, from the post-processing unit, the version information of the firmware held in the post-processing unit, a second presetting regarding an update method in which, in a case where a version of the firmware held by the post-processing unit is only upgraded, the update of the firmware held by the post-processing unit with the update firmware is permitted, wherein the second presetting is preset before the printing apparatus obtains, from the post-processing unit, the version information of the firmware held in the post-processing unit, and a third presetting regarding an update method in which, in both cases where the version of the firmware held by the post-processing unit is upgraded and the version of the firmware held by the post-processing unit is downgraded, the update of the firmware held by the post-processing unit with the update firmware is permitted, wherein the third presetting is preset before the printing apparatus obtains, from the post-processing unit, the version information of the firmware held in the post-processing unit;

obtaining, from the post-processing unit, the version information of the firmware held in the post-processing unit after the presetting presets the preset update method;

a first determining step of determining whether the post-processing unit has been connected to the connection interface, when the printing apparatus is started;

a second determining step of determining whether the firmware held by the post-processing unit is to be updated, based on a result of presetting by the presetting and the version information of the firmware obtained by the obtaining, in a case where the first determining step determines that the post-processing unit has been connected to the connection interface; and updating the firmware held by the post-processing unit with the update firmware stored in the memory in a case where the second determining step determines that updating of the firmware held by the post-processing unit is to be updated, wherein the update is performed without user's input regarding selecting a version of the firmware for the post-processing unit after the version information of the firmware held in the post-processing unit is obtained, wherein, in a case where the third presetting is preset by the presetting and a version of the update firmware is different from the version of the firmware held by the post-processing unit, the second determining step determines that the firmware held by the post-processing unit is to be updated, in a case where the second presetting is preset by the presetting and the version of the update firmware is later than the version of the firmware held by the post-processing unit, the second determining step determines that the firmware held by the post-processing unit is to be updated, in a case where the second presetting is preset by the presetting and the version of the update firmware is older than the version of the firmware held by the post-processing unit, the second determining step determines that the firmware held by the post-processing unit is not to be updated, and in a case where the first presetting is preset by the presetting, the second determining step determines that the firmware held by the post-processing unit is not to be updated, and wherein the presetting, the first determining step, the second determining step, and the updating are implemented at least in part by the processor.

6. A computer-readable non-transitory storage medium that stores a program of instructions executable by a processor to perform a method of controlling update for a printing apparatus, the printing apparatus configured to execute print processing on a sheet, the printing apparatus having a connection interface configured to connect a post-processing unit which executes post-processing on a sheet on which the print processing has been executed, the post-processing unit holding firmware, the method performed using the processor and a memory, the memory configured to store control firmware for controlling operation of the printing apparatus and update firmware for updating the firmware held by the post-processing unit, wherein the memory stores the update firmware before the post-processing unit is connected to the information processing apparatus, the method comprising:

presetting, according to a user's instruction before the printing apparatus obtains version information regarding the firmware from the post-processing unit, wherein the presetting is configured to preset a presetting, as a preset update method, to select either one of selectable options including a first presetting regarding an update method in which update of the firmware held by the post-processing unit with the update firmware is not permitted, wherein the first presetting is preset before the printing apparatus obtains, from the post-processing unit, the version information of the firmware held in the post-processing unit, a second presetting regarding an update method in which, in a case where a version of the firmware held by the post-processing unit is only upgraded, the update of the firmware held by the post-processing unit with the update firmware is permitted, wherein the second presetting is preset before the printing apparatus obtains, from the post-processing unit, the version information of the firmware held in the post-processing unit, and a third presetting regarding an update method in which, in both cases where the version of the firmware held by the post-processing unit is upgraded and the version of the firmware held by the post-processing unit is downgraded, the update of the firmware held by the post-processing unit with the update firmware is permitted, wherein the third presetting is preset before the printing apparatus obtains, from the post-processing unit, the version information of the firmware held in the post-processing unit;

obtaining, from the post-processing unit, the version information of the firmware held in the post-processing unit after the presetting presets the preset update method;

a first determining step of determining whether or not the post-processing unit has been connected to the connection interface, when the printing apparatus is started;

a second determining step of determining whether or not the firmware held by the post-processing unit is to be updated, based on a result of presetting by the presetting and the version information of the firmware obtained by the obtaining, in a case where the first determining step determines that the post-processing unit has been connected to the connection interface; and updating the firmware held by the post-processing unit with the update firmware stored in the memory in a case where the second determining step determines that updating of the firmware held by the post-processing unit is to be updated, wherein the update is performed without user's input regarding selecting a version of the firmware for the post-processing unit after the version information of the firmware held in the post-processing unit is obtained, wherein, in a case where the third presetting is preset by the presetting and a version of the update firmware is different from the version of the firmware held by the post-processing unit, the second determining step determines that the firmware held by the post-processing unit is to be updated, in a case where the second presetting is preset by the presetting and the version of the update firmware is later than the version of the firmware held by the post-processing unit, the second determining step determines that the firmware held by the post-processing unit is to be updated, in a case where the second presetting is preset by the presetting and the version of the update firmware is older than the version of the firmware held by the post-processing unit, the second determining step determines that the firmware held by the post-processing unit is not to be updated, and in a case where the first presetting is preset by the presetting, the second determining step determines that the firmware held by the post-processing unit is not to be updated.

7. The printing apparatus according to claim 1, wherein a combination of the control firmware and the update firmware is a combination guaranteed to operate properly by the manufacturer of the printing apparatus.

8. The printing apparatus according to claim 1, wherein upon condition that the first presetting is set for the printing apparatus by the presetting unit, downgrade of the firmware held by the post-processing unit using downgrade firmware is prohibited either, and wherein upon condition that the first presetting is set by the presetting unit, the second determining unit determines that the firmware held by the post-processing unit is not to be downgraded either.

9. A printing apparatus configured to execute print processing on a sheet, the printing apparatus comprising:

a connection interface circuit configured to connect a post-processing unit which executes post-processing on a sheet on which the print processing has been executed by the printing apparatus, wherein the post-processing unit holds firmware;

a memory configured to store update firmware for updating firmware held by the post-processing unit, wherein the memory stores the update firmware before the post-processing unit is connected to the connection interface;

a presetting unit configured to preset, according to a user's instruction before the printing apparatus obtains, from the post-processing unit, version information of the firmware held in the post-processing unit, wherein the presetting unit is configured to preset a presetting, as a preset update method, to select either one of selectable options including a first presetting regarding an update method in which, only in a case where the version of the update firmware is later than the version of the firmware held by the post-processing unit, the update of the firmware held by the post-processing unit with the update firmware is permitted wherein the first presetting is preset before the printing apparatus obtains the version information of the firmware held in the post-processing unit, and a second presetting regarding an update method in which, in both cases where the version of the update firmware is later than the version of the firmware held by the post-processing unit and the version of the update firmware is older than the version of the firmware held by the post-processing unit, the update of the firmware held by the post-processing unit with the update firmware is permitted wherein the second presetting is preset before the printing apparatus obtains the version information regarding the firmware in the post-processing unit;

an obtaining unit configured to obtain, from the post-processing unit, the version information of the firmware held in the post-processing unit after presetting unit presets the preset update method via the connection interface circuit;

a first determining unit configured to determine whether the post-processing unit has been connected to the connection interface circuit, when the printing apparatus is started;

a second determining unit configured to determine whether the firmware held by the post-processing unit is to be updated, based on a result of presetting by the presetting unit and the version information of the firmware obtained by the obtaining unit, after the first determining unit determines that the post-processing unit has been connected to the connection interface circuit; and an updating unit configured to update the firmware held by the post-processing unit with the update firmware stored in the memory in a case where the second determining unit determines that the firmware held by the post-processing unit is to be updated, wherein the update is performed, without user's input regarding selecting a version of the update firmware for the post-processing unit after the obtaining unit obtains the version information of the firmware held in the post processing unit;

in a case where the first presetting is preset by the presetting unit and the version of the update firmware is later than the version of the firmware held by the post-processing unit, the second determining unit determines that the firmware held by the post-processing unit is to be updated, in a case where the first presetting is preset by the presetting unit and the version of the update firmware is older than the version of the firmware held by the post-processing unit, the second determining unit determines that the firmware held by the post-processing unit is not to be updated;

wherein, in a case where the second presetting is preset by the presetting unit and a version of the update firmware is different from the version of the firmware held by the post-processing unit, the second determining unit determines that the firmware held by the post-processing unit is to be updated, and wherein the presetting unit, the first determining unit, the second determining unit, and the updating unit are implemented at least in part by at least one or more processor.

* * * * *